US008684463B2

(12) United States Patent
Rumler (10) Patent No.: US 8,684,463 B2
(45) Date of Patent: Apr. 1, 2014

(54) APPARATUS AND METHOD FOR SELECTIVELY RECLINING A VEHICLE SEAT BACK (75) Inventor: Thomas C. Rumler, Noblesville, IN (US)

(73) Assignee: Indiana Mills & Manufacturing Inc., Westfield, IN (US)

(*) Notice: Subject to any disclaimer, the term of this patent is extended or adjusted under 35 U.S.C. 154(b) by 46 days.

(21) Appl. No.: 13/500,396

(22) PCT Filed: Oct. 7, 2010

(86) PCT No.: PCT/US2010/051850
§ 371 (c)(1),
(2), (4) Date: May 22, 2012

(87) PCT Pub. No.: WO2011/044379
PCT Pub. Date: Apr. 14, 2011

(65) Prior Publication Data
US 2012/0228914 A1 Sep. 13, 2012

Related U.S. Application Data (60) Provisional application No. 61/249,521, filed on Oct. 7, 2009.

(51) Int. Cl.
B60N 2/02 (2006.01)
B60N 2/20 (2006.01)
B60N 2/22 (2006.01)
B60N 2/46 (2006.01)

(52) U.S. Cl.
USPC .................. 297/359; 297/361.1; 297/378.12; 297/378.14; 297/411.3

(58) Field of Classification Search
USPC .................. 297/359, 361.1, 378.11, 378.12, 297/378.14, 411.3
See application file for complete search history.

(56) References Cited

U.S. PATENT DOCUMENTS

| 3,276,816 A | * | 10/1966 | Edwards ....................... 297/359 |
| 3,586,372 A | * | 6/1971 | Barecki et al. ................ 297/359 |
| 3,633,964 A | * | 1/1972 | Bertin .......................... 297/359 X |
| 4,881,778 A | * | 11/1989 | Stephenson et al. ...... 297/411.39 |
| 4,886,317 A | * | 12/1989 | Konzmann et al. ....... 297/411.39 |
| 4,978,170 A | * | 12/1990 | Pelz et al. ................. 297/411.39 |
| 5,425,568 A | * | 6/1995 | Sliney et al. ............. 297/378.11 |
| 5,599,066 A | | 2/1997 | Chih |

(Continued)

OTHER PUBLICATIONS

PCT Search Report/Written Opinion prepared for PCT/US2010/051850, mailed Dec. 3, 2010.

Primary Examiner — Rodney B White
(74) Attorney, Agent, or Firm — Barnes & Thornburg LLP (57) ABSTRACT An apparatus for selectively moving a seat back of a motor vehicle seat relative to a seat bottom includes an armrest movably mounted to the vehicle seat, a seat back actuator and mechanical linkage engaged with and between the armrest and the seat back actuator. The armrest has a first position that supports an arm of an occupant of the motor vehicle seat, and is movable from the first position to a second position. The seat back actuator is responsive to actuation to allow the seat back of the vehicle seat to be moved relative to the seat bottom, and is responsive to release thereof to block movement of the seat back relative to the seat bottom. The mechanical linkage is responsive to movement of the armrest from the first position to the second position to actuate the seat back actuator and to otherwise release the seat back actuator.

20 Claims, 8 Drawing Sheets

(56) References Cited

U.S. PATENT DOCUMENTS

| | | |
|---|---|---|
| 6,238,002 B1 | 5/2001 | Brewer et al. |
| 8,282,160 B2 * | 10/2012 | Lutzka et al. ........ 297/378.12 X |
| 2003/0230918 A1 | 12/2003 | Serber et al. |
| 2008/0084101 A1 | 4/2008 | Powicki et al. |

* cited by examiner

APPARATUS AND METHOD FOR SELECTIVELY RECLINING A VEHICLE SEAT BACK

CROSS REFERENCE TO RELATED APPLICATIONS

This application is a national stage entry under 35 USC §371(b) of International Application No. PCT/US2010/051850 filed Oct. 7, 2010 which claims priority to, and the benefit of, U.S. Provisional Patent Application Ser. No. 61/249,521, filed Oct. 7, 2009, the disclosures of both of which are incorporated herein by reference.

FIELD OF THE INVENTION

The present invention relates generally to seats for motor vehicles, and more specifically to apparatuses and methods for selectively reclining the backs of such motor vehicle seats.

BACKGROUND

Conventional vehicle seats may include mechanical levers and/or electrical switches for reclining the associated seat back. With such conventional mechanisms, the occupant must first locate the lever or switch, and then actuate the lever or switch to recline the seat back. It is desirable to provide an improved apparatus for reclining vehicle seats.

SUMMARY

The present invention may comprise one or more of the features recited in the attached claims, and/or one or more of the following features and combinations thereof. An apparatus for selectively moving a seat back of a motor vehicle seat relative to a seat bottom of the motor vehicle seat may comprise an armrest movably mounted to the motor vehicle seat, a seat back actuator and mechanical linkage engaged with and between the armrest and the seat back actuator. The armrest may have a first position relative to the motor vehicle seat that supports an arm of an occupant of the motor vehicle seat. The armrest may be movable relative to the vehicle seat in response to a force applied thereto from the first position to a second position. The seat back actuator may be responsive to actuation thereof to allow the seat back of the motor vehicle seat to be moved relative to the seat bottom, and may be responsive to release thereof to block movement of the seat back relative to the seat bottom. The mechanical linkage may be responsive to movement of the armrest from the first position to the second position to actuate the seat back actuator and to otherwise release the seat back actuator.

The motor vehicle seat may comprise a seat frame with the seat bottom mounted thereto. The seat back may be movably mounted via the seat back actuator to the seat frame adjacent one end thereof with an opposite end of the seat back extending away from the seat frame and the seat bottom. The seat back may be movable relative to the seat frame and the seat bottom between an upright position and a fully reclined position when the seat back actuator is actuated. The seat back may be non-movably positioned in a desired position between the upright position and the fully reclined position by releasing the seat back actuator after the seat back is moved to the desired position with the seat back actuator actuated. The seat back actuator may comprise a biasing member that biases the seat back to the upright position when the seat back actuator is actuated. The seat back may be movable to the desired position from the upright position if a rearward force sufficient to overcome a biasing force of the biasing member is applied to the seat back when the seat back actuator is actuated. The seat back may be pivotably mounted to the seat frame via the seat back actuator such that the seat back is pivotable between the upright position and the fully reclined position when the seat back actuator is actuated.

The armrest may be positioned above the seat bottom, and the armrest may be movable downwardly toward the seat bottom from the first position to the second position thereof. Alternatively, the armrest may be movable upwardly away from the seat bottom from the first position to the second position thereof.

The armrest may define a mounting end and a free end, and the mounting end may be pivotably mounted to one side of the seat back. The mechanical linkage may comprise a biasing member that normally biases the armrest to the first position. The seat back actuator may be actuated by applying a downward force to the armrest sufficient to overcome a biasing force of the biasing member of the mechanical linkage and move the mechanical linkage sufficiently to actuate the seat back actuator. The armrest may be movable only downwardly from the first position to the second position thereof. Alternatively, the armrest may be movable downwardly from the first position to the second position thereof, and may further be movable upwardly from the first position thereof toward the seat back, without actuating the seat back actuator, to facilitate occupant entrance into and egress from the motor vehicle seat. In this latter embodiment, the mounting end of the armrest may define a slot therethrough, and the armrest may be rotatable upwardly about the slot between the first position thereof and a third position adjacent to a side of the seat back.

The seat back actuator may comprise a first member mounted to one of the seat back and a frame of the motor vehicle seat, a second member mounted to the other of the frame and the seat back and movable relative to the first member, and a locking member positioned to normally block movement between the first and second members to thereby normally block movement of the seat back relative to the motor vehicle seat. The locking member may be further movable to an actuated position that allows movement between the first and second members. The mechanical linkage may be coupled to the locking member and may be responsive to movement of the armrest from the first to the second position thereof to move the locking member to the actuated position.

The armrest may define a mounting end and a free end, with the mounting end pivotably mounted to one side of the seat back. The mechanical linkage may comprise a first member mounted to the mounting end of the armrest, a second member movably mounted to a frame of the motor vehicle seat, a first linking member attached between the first and second members, a second linking member attached between the second member and the seat back actuator, and a biasing member extending between the first and second members, with the biasing member normally biasing the first member toward the second member. Application of a force applied to the armrest sufficient to overcome a biasing force of the biasing member such that the armrest moves from the first position to the second position thereof may cause the first member to move the second member away from the seat back actuator such that the second linking member actuates the seat back actuator.

Movement of the seat back relative to the seat bottom may require a rearward force applied to the seat back while the seat back actuator is actuated.

A method of reclining a seat back of a motor vehicle seat relative to a seat bottom of the motor vehicle seat, wherein the motor vehicle seat has an armrest movably coupled to a seat back actuator responsive to actuation thereof to allow the seat back of the motor vehicle seat to be moved relative the seat bottom, may comprise applying a force to the armrest sufficient to move the armrest to a position that actuates the seat back reclining actuator, and with the force applied to the armrest to maintain the seat back reclining actuator actuated, applying a rearward force to the seat back to thereby recline the seat back to a reclined position relative to the seat bottom.

The seat back actuator may be responsive to release thereof to block movement of the seat back relative to the seat bottom, and the method may further comprise removing the force applied to the armrest to maintain the seat back in the reclined position.

The seat back may be continuously movable between an upright position and a fully reclined position when the seat back actuator is actuated, and applying a rearward force to the seat back may comprise applying a rearward force to the seat back while the seat back reclining actuator is actuated to thereby recline the seat back to a reclined position between the upright position and the fully reclined position. The seat back actuator may include a biasing member configured to bias the seat back to return the seat back from the reclined position to the upright position when the seat back actuator is actuated and no rearward force is applied to the seat back, and the method may further comprise returning the seat back from the reclined position to the upright position by applying the force to the armrest with no rearward force applied to the seat back.

The seat back actuator may be responsive to release thereof to block movement of the seat back relative to the seat bottom, and the method may further comprise removing the downward force applied to the armrest to maintain the seat back in the reclined position. The seat back actuator may include a biasing member configured to return the seat back from the reclined position to the upright position when the seat back actuator is actuated and no rearward force is applied to the seat back, and the method may further comprise returning the seat back from the reclined position to the upright position by applying the force to the armrest with no rearward force applied to the seat back.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
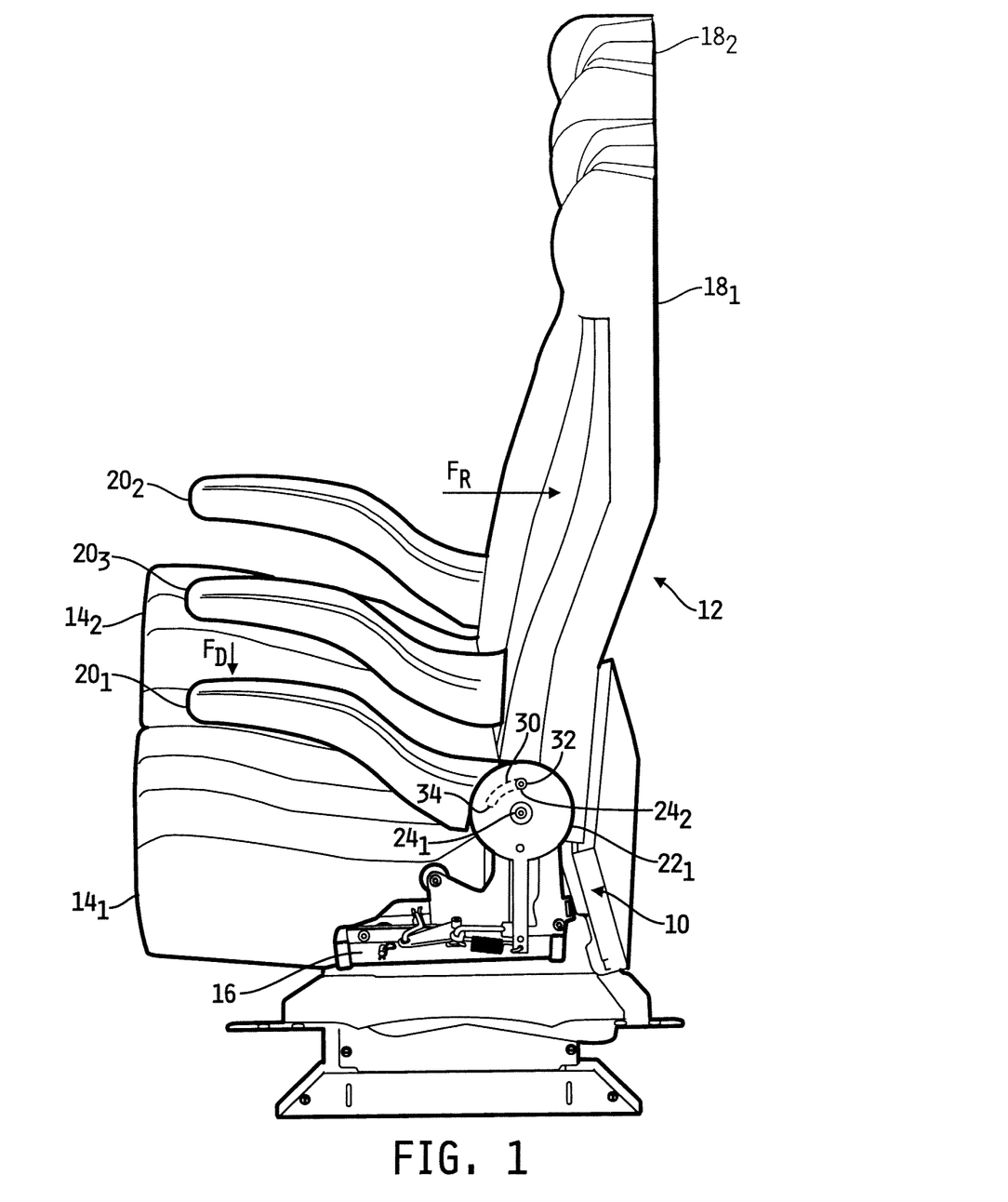
FIG. 1 is a perspective view of one side a motor vehicle seat showing one illustrative embodiment of an apparatus for reclining one of the back portions of the vehicle seat.

Referring now to FIG. 1, a perspective view is shown of one side a motor vehicle seat 12 showing one illustrative embodiment of an apparatus for reclining one of the back portions $18_1$ of the vehicle seat 12. In the illustrated embodiment, the motor vehicle seat 12 includes a pair of side-by-side seat bottoms $14_1$ and $14_2$ mounted to a seat frame 16 that is configured to be mounted to a support surface, e.g., a floor, of a motor vehicle. A reclining seat back $18_1$ is movably mounted to the seat frame 16 and forms a seat back to the seat bottom $14_1$, and another reclining seat back $18_2$ is movably mounted to the seat frame 16 and forms a seat back to the other seat bottom $14_2$. A first armrest $20_1$ is movably mounted to the vehicle seat 12, e.g., to the seat back $18_1$ and/or to the seat frame 16, and extends along one side of the vehicle seat 12, e.g., adjacent to an outer edge of the seat bottom $14_1$ and corresponding seat back $18_1$, and is generally positioned in an occupant arm support position to support an arm of an occupant of the vehicle seat 12 as illustrated in FIG. 1. A second armrest $20_2$ is also movably mounted to the vehicle seat 12 e.g., to the seat back $18_2$ and/or to the seat frame 16, and extends along one side of the vehicle seat 12, e.g., adjacent to an outer edge of the seat bottom $14_2$ and corresponding seat back $18_2$, and is generally positioned in an occupant arm support position to support an arm of an occupant of the vehicle seat 12 as illustrated in FIG. 1. A third armrest $20_3$ is fixedly secured to the vehicle seat 12 and extends forwardly from between the two seats $14_1/14_2$ and corresponding seat backs $18_1/18_2$.

While the vehicle seat 12 is illustrated and has been described herein as a two-occupant motor vehicle seat, it will be understood that the vehicle seat may alternatively be configured to be occupied by more or fewer occupants, and may further be outfitted with one or more conventional restraint systems. The motor vehicle may illustratively and without limitation be any transportation vehicle configured to transport occupants by land, air or water, and examples include, but should not be limited to, conventional automobiles, trucks, busses, motor coaches, trains, monorail systems, watercrafts, aircrafts, and the like.

Figure 2:
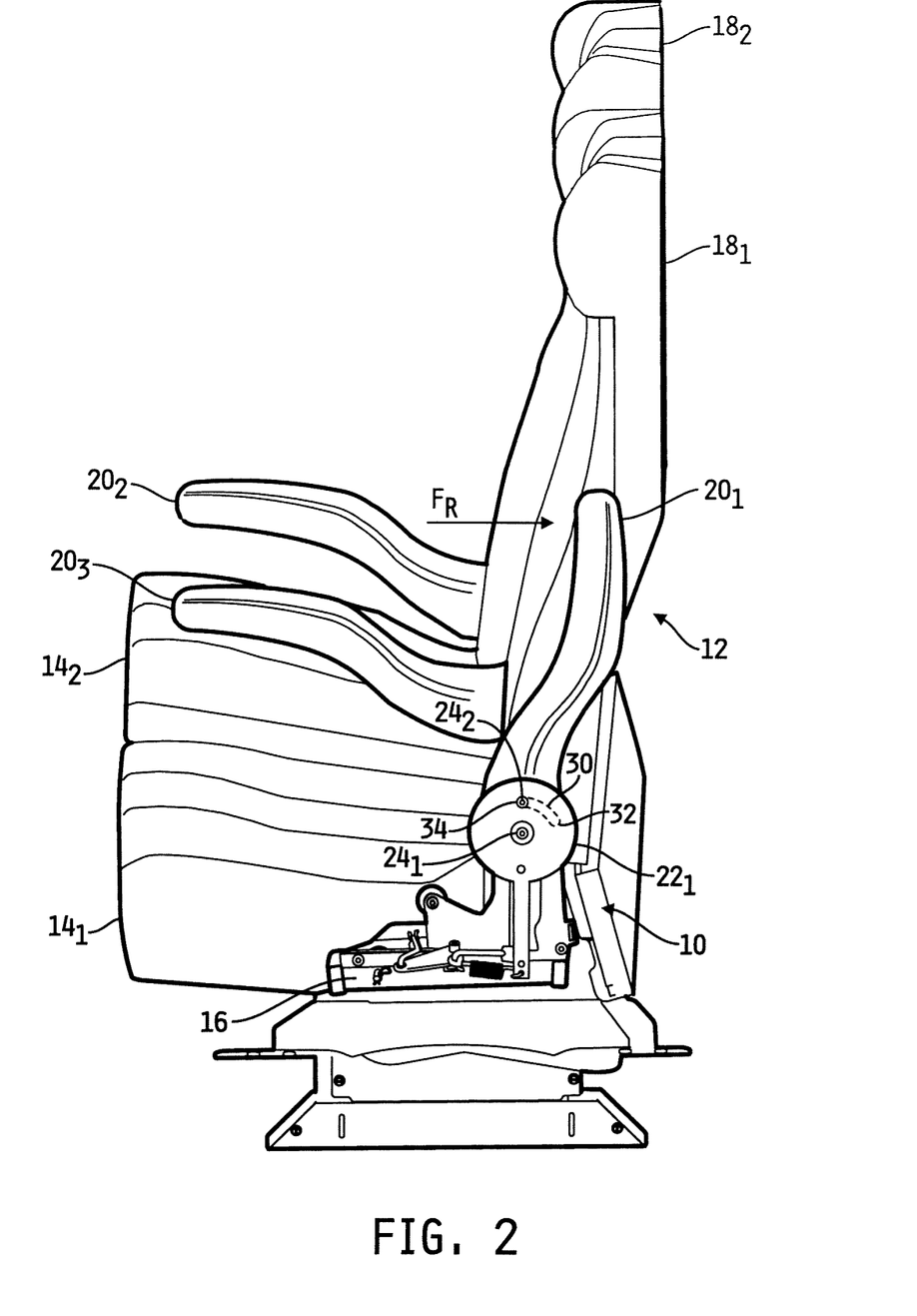
FIG. 2 is a perspective view similar to FIG. 1 showing one of the armrests of the seat in an upright position so as not to impede occupant entrance into or egress from the vehicle seat.
Figure 3:
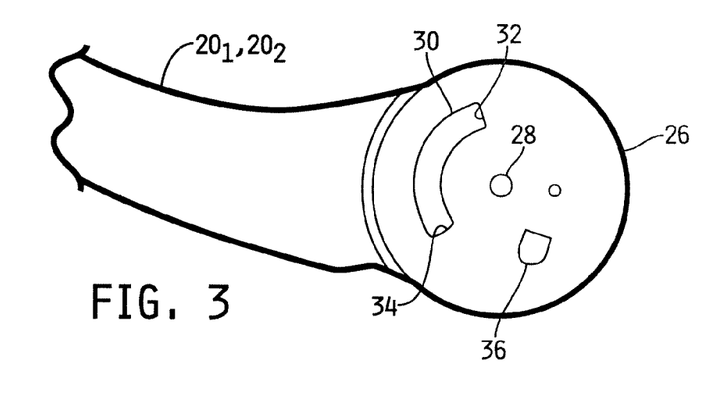
FIG. 3 is a magnified view of the seat-engaging end of the arm rest depicted in the upright position in FIG. 2.

In the embodiment illustrated in FIG. 1, the apparatus for reclining the seat back $18_1$ includes the armrest $20_1$ and a mechanical linkage 10 that is coupled between, i.e., engaged with and between, the armrest $20_1$ and a seat back reclining actuator (not shown in FIG. 1) that is mounted to the vehicle seat frame 16. Referring now to FIGS. 1-3, one illustrative embodiment of the armrest $20_1$ and structure for movably mounting the armrest $20_1$ to the vehicle seat 12 is shown. As illustrated in FIGS. 1 and 2, the mechanical linkage 10 includes a plate member $22_1$ defining a number of openings therethrough. In the illustrated embodiment, for example, the plate member $22_1$ is circular in cross section and defines an opening $24_1$ centrally therethrough and another opening $24_2$ located above the opening $24_1$. The mounting end 26 of the armrest $20_1$ illustrated in FIG. 3 is likewise circular in cross section, and defines a central opening 28 therethrough as well as a slot 30 generally positioned between the opening 28 and the arm supporting portion of the armrest $20_1$. It will be understood that the plate member $22_1$ and/or the mounting end 26 of the armrest $20_1$ need not be circular in cross section and that other shapes of the plate member $22_1$ and/or the mounting end 26 of the armrest $20_1$ are contemplated by this disclosure.

The slot 30 illustratively provides for the ability to rotate the armrest $20_1$ upwardly toward the seat back $18_1$, and ultimately to a position generally adjacent to the outer side of the seat back $18_1$ to facilitate occupant entrance into and egress from the vehicle seat 10 as shown in FIG. 2. Illustratively, the mounting end 26 of the armrest $20_1$ may alternatively to the slot 30, or additionally to the slot 30, define an another opening 36 therethrough for use in an alternate embodiment as will be described hereinafter with respect to FIG. 9. It will be understood, however, that the opening 36 is not required in the embodiment illustrated in FIGS. 1-3. Similarly, the slot 30 is not required in embodiments in which the armrest $20_1$ does not rotate upwardly as illustrated in FIG. 2.

The armrest $20_1$ is illustratively movably mounted to the vehicle seat 10; in the illustrated embodiment, specifically to the outside of the seat back $18_1$ with a first fixation element, e.g., a screw, bolt or the like, extending through the opening $24_1$ defined through the plate $22_1$, through the opening 28 defined through the mounting end 26 of the armrest $20_1$ and into engagement with the seat back $18_1$. In embodiments of the armrest $20_1$ that include the slot 30, a second fixation element, e.g., a screw, bolt or the like, extends through the opening $24_2$ defined through the plate $22_1$, through the slot 30 and into engagement with the seat back $18_1$. The slot defines opposing ends 32 and 34 as illustrated in FIG. 3, and with the armrest $20_1$ in the occupant arm supporting, or down, position as illustrated in FIG. 1, the second fixation element rests against the end 32 of the slot 30. As the armrest $20_1$ is rotated upwardly in a clockwise direction, the armrest $20_1$ pivots about the first fixation element extending through the opening $24_1$, and the second fixation element travels along the slot 30 toward the end 34 thereof. In the fully upright position of the armrest $20_1$ illustrated in FIG. 2, the second fixation element rests against the end 34 of the slot 30, and further clockwise rotation is blocked by the end 34 of the slot 30.

Figure 4:
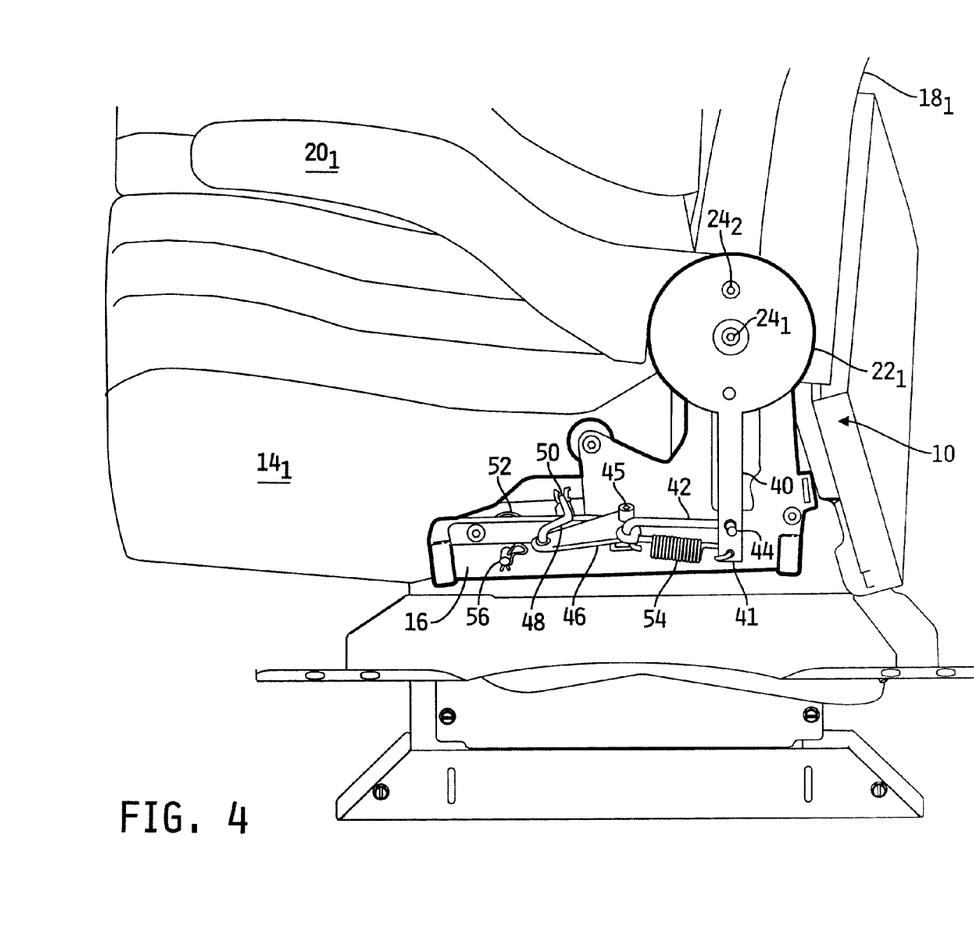
FIG. 4 is a magnified view of the seat back reclining apparatus illustrated in FIG. 1, shown in FIG. 4 in its default position in which the seat back may not be reclined
Figure 5:
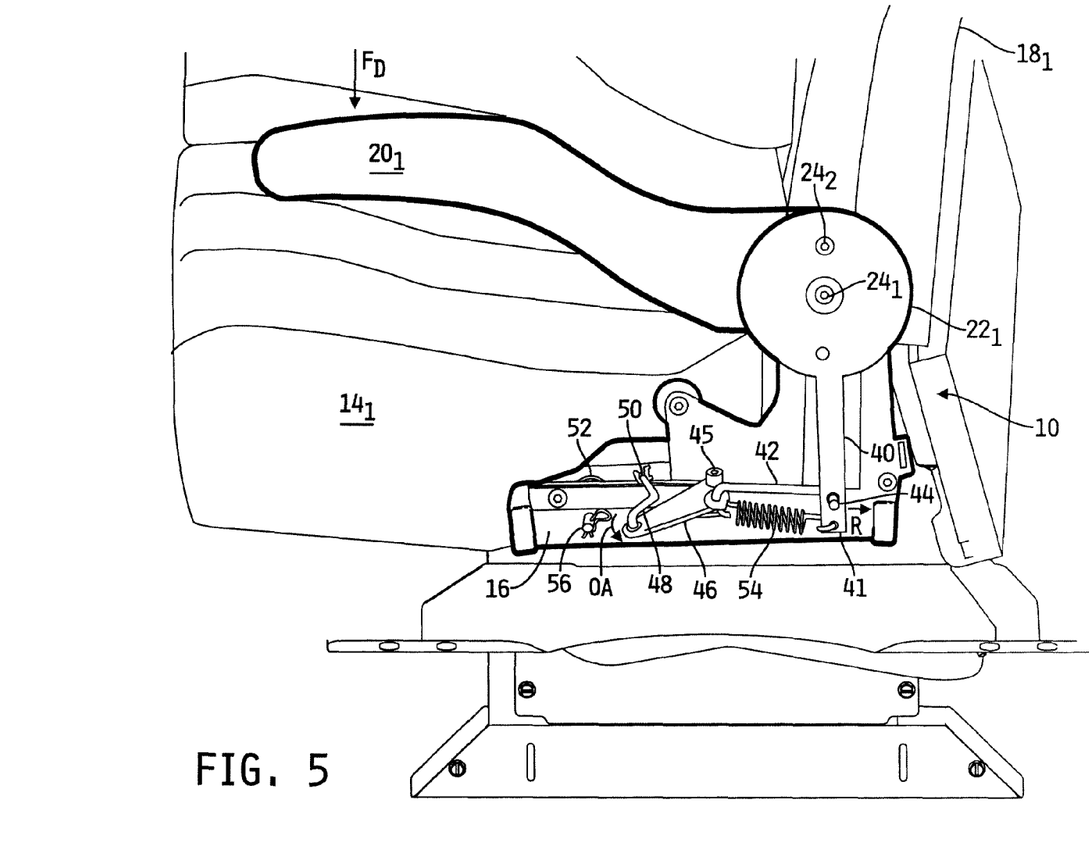
FIG. 5 is a magnified view similar to FIG. 4 with the seat back reclining apparatus shown in its engaged position in which the seat back may be selectively reclined.

Referring now to FIGS. 4 and 5, some of the details of one illustrative embodiment of the mechanical linkage 10 are shown. In the illustrated embodiment, a lever 40 is integral with and extends downwardly from the plate $22_1$ to a free end 41 of the lever 40. Alternatively, the lever 40 may be separate from and affixed to the plate $22_1$. A plate member 46 is movably mounted to the seat frame 16, e.g., pivotably mounted to the seat frame 16 at pivot point 45 via a suitable fixation element, and a linking member 42 extends between the lever 40 and one end of the plate 46. In the illustrated embodiment, the linking member 42 is rigid, and one end 44 of the rigid linking member 42 extends through and engages an opening defined through the lever 44 near the free end 41 thereof, and an opposite end of the linking member 42 is affixed to, e.g., extends through and engages, one end of the plate member 46. It will be understood that the linking member 42 may alternatively be flexible or semi-rigid, and/or may alternatively be affixed at opposite ends thereof to the plate member 46 and to the lever 40 using other conventional mounting structures and/or techniques, and/or be affixed, attached or mounted to, or engaged with, the plate member 46 and the lever 40 at different locations relative to the plate member 46 and/or the lever 40.

One end of another linking member 48 is affixed to an opposite end of the plate member 46 such that movement of the plate 46 about its pivot point 45 by movement of the linking member 42 causes the linking member 48 to also move. The opposite end 50 of the linking member 48 engages a seat back actuator 52 having one end that is mounted, e.g., via at least one fixation element 56, to the frame 16 of the vehicle seat 12 and an opposite end that is mounted to, e.g., via at least one fixation element, to or near a lower end of the seat back $18_1$. The seat back actuator 52 is generally configured to be responsive to actuation thereof to allow the seat back $18_1$ to be forcibly reclined and to be responsive to release thereof to block movement of the seat back $18_1$ relative to the vehicle seat 12. In the illustrated embodiment, the linking member 48 is rigid, although it will be understood that the linking member 48 may alternatively be flexible or semi-rigid, and/or may alternatively be affixed at opposite ends thereof to the plate member 46 and to the seat back actuator 52 using other conventional mounting structures and/or techniques, and/or be affixed, attached or mounted to, or engaged with, the plate member 46 at different locations relative to the plate member 46.

Figure 6:
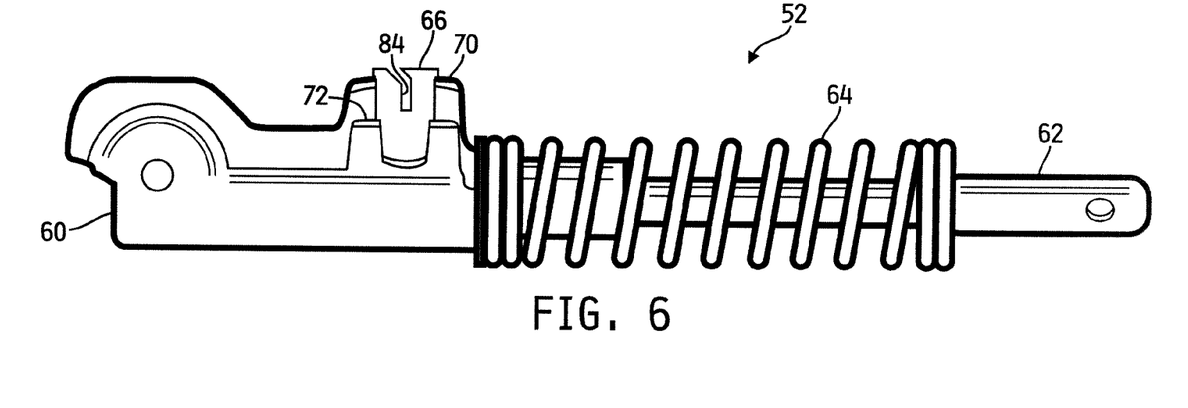
FIG. 6 is a side view of one illustrative embodiment of a seat back reclining actuator used in the embodiment illustrated in FIGS. 1-5.
Figure 7:
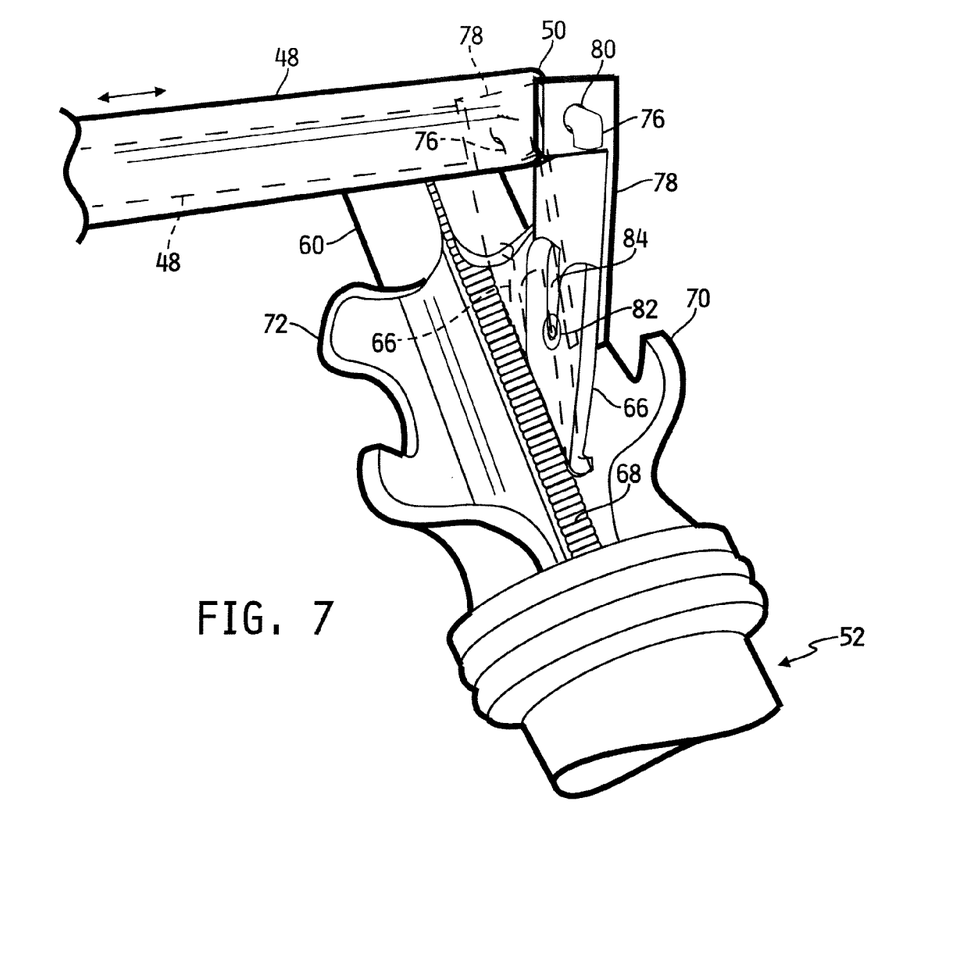
FIG. 7 is a magnified top plan view of the seat back reclining actuator of FIG. 6 shown by solid-line representation in its default, non-actuated position that does not allow reclining of the vehicle seat back, and shown by dashed-line representation in its actuated position that allows selective reclining of the vehicle seat back.
Figure 8:
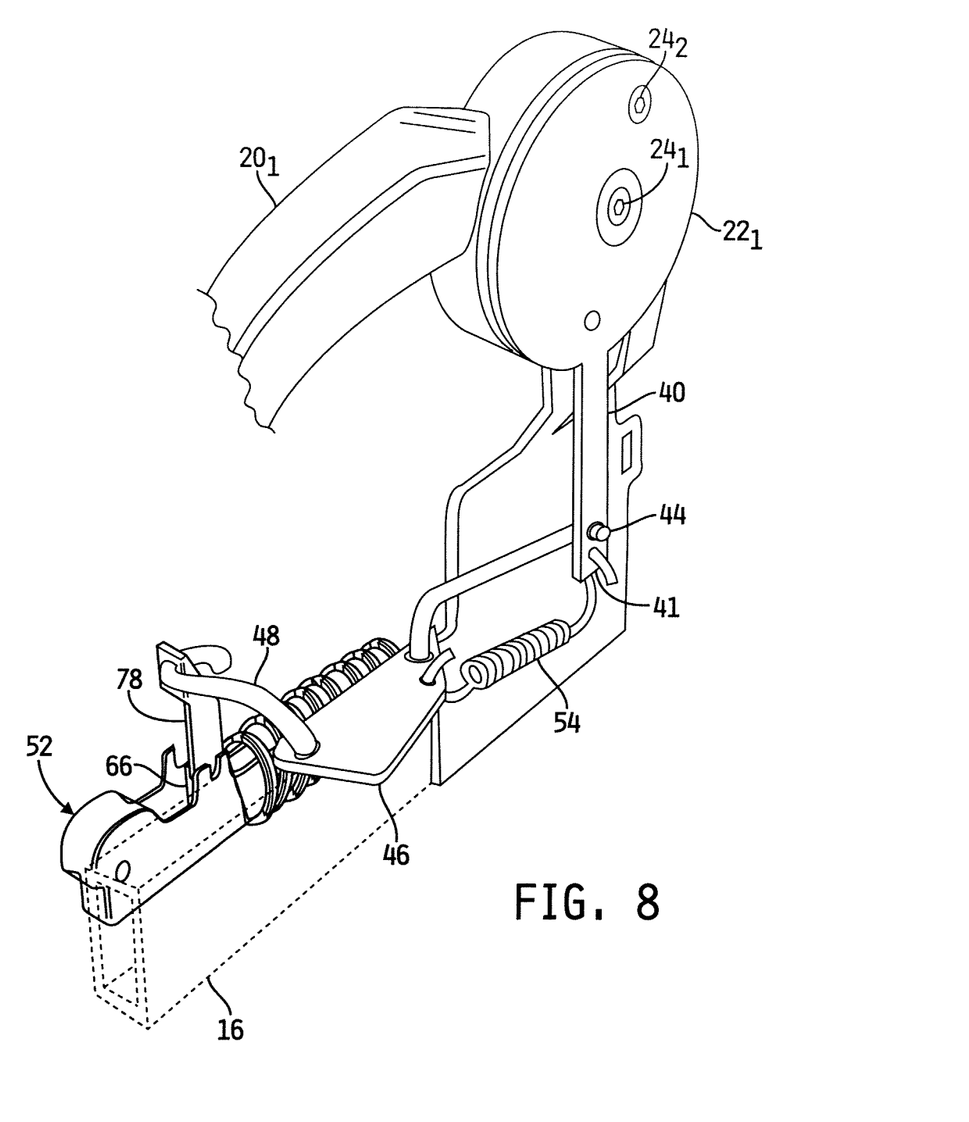
FIG. 8 is a perspective view of certain parts of the vehicle seat, frame and seat reclining apparatus, with other parts omitted for clarity of illustration, showing connection of the armrest to the seat back actuator via interconnected mechanical linkage members.

Referring now to FIGS. 6-8, one illustrative embodiment of the seat back actuator 52 is shown. In the illustrated embodiment, the seat back actuator 52 includes a member or housing 60 that is mounted to the seat frame 16, e.g., via the fixation element 56, and another member or rod 62 that is movable linearly relative to the member or housing 60 and that is affixed to the seat back $18_1$, e.g., at or near the bottom end thereof. Alternatively, the housing 60 may be mounted to the seat back $18_1$ and the rod 62 may be mounted to the seat frame 16. In any case, a biasing member, e.g., a spring, 64 is positioned between the housing 60 and the rod 62, and has a biasing force that forces the free end of the rod 62 away from the housing 60. The housing 62 defines an opening therein between a pair of opposing side flanges 70 and 72. The housing carries a number of biasing members 68 which grip the rod 62. In the embodiment illustrated in FIGS. 6-8, the seat back actuator 52 is provided in the form of a Mechlok® mechanical, linear locking device commercially available from, e.g., Porter Group, LLC of Novi, Mich., although this disclosure contemplates alternative embodiments in which the seat back actuator 52 is provided in the form of other conventional mechanical or electro-mechanical locking devices.

In the embodiment shown in FIGS. 6-8, the number of biasing members 68 is illustratively provided in the form of two counter-wound wrapping springs which normally grip the rod 62 securely and prevent the rod 62 from moving linearly, i.e., axially, relative to the housing 60 along its longitudinal axis. A locking member 66 is operatively engaged with the number of biasing members 68 and may be rotated radially with respect to the housing 60 to actuate the seat back actuator 52 and thereby allow linear, i.e. axial, movement of the rod 2 relative to the housing 60. As illustrated in FIG. 7, the locking member 66 is normally biased against or near one of the flanges 70 of the housing, and this is defined for purposes of this document as the released position of the seat back actuator 52. In this position, the number of biasing members 68 securely grips the rod 62 and prevents the rod 62 from moving linearly, i.e., axially, relative to the housing 60 along the longitudinal axis thereof.

As further illustrated in dashed-line representation in FIG. 7, the locking member 66 can be forced radially away from the flange 70 toward the center of the opening defined by the flanges 70 and 72, and this position is defined for purposes of this document as the actuated position of the locking member 66 and of the seat back actuator 52. In this position, the number of biasing members 68 unwinds slightly and allows the rod 62 to be forcibly moved, e.g., extended or retracted, linearly, i.e., axially, relative to the housing 60 along its longitudinal axis. Thus, the actuated position of the seat back actuator 52 locks linear, i.e., axial, movement of the rod 62 relative to the housing, and the released position of the seat back actuator 52 allows linear, i.e., axial, movement of the rod 62 relative to the housing 60.

The rod 62 is biased linearly by the spring 64 to retract toward and within the housing 66 when the seat back actuator 52 is actuated. To extend the rod 62 outwardly away from the housing 60, a linear force must be applied to the rod 62, when the seat back actuator 52 is actuated, that is greater than the retracting bias applied by the spring 64.

The biasing member 64 provides a biasing force between the housing 60 and the rod 62 that biases the rod 62 outwardly away from the housing 60 to a position of the rod 62 defined by the forced linear movement of the rod 62 relative to the housing 60 when the locking member 66 is actuated. When the locking member 66 is thereafter released, i.e., when radial force applied to the locking member 66 is removed from the locking member 66, the locking member 66 returns under the bias of the number of biasing members 68 to its normally biased, i.e., released, position against or near the flange 70 of the housing, and when this occurs the linear position of the rod 62 relative to the housing 60 again becomes locked or secured from linear (axial) movement by the number of biasing members 68. Again, if no linear force is applied to the rod 62 to extend it outwardly away from the housing when the locking member 66 is actuated, the retracting bias of the spring 64 will force the rod 62 inwardly to its fully retracted position within the housing 60.

Referring now to FIGS. 7 and 8, one illustrative embodiment is shown of a structure for connecting or attaching the linking member 48, adjacent to its end 50, to the seat back actuator. In the illustrated embodiment, an engagement member, e.g., a shaped pin, 76, extends from the end 50 of the linking member 48. The engagement member 76 may be attached to or integral with the linking member 48, and may alternatively extend from a location of the linking member 48 other than the end 50. In any case, a plate member 78 defines an opening 80 therethrough at one end thereof, and the opening 80 is sized to receive the engagement member 76 therein such that the engagement member 76, and thus the linking member 48, engages, e.g., attaches to, the plate member 78. A fixation element 82 extends through a gap or slot 84 defined in the locking member 66 and engages the plate member 78. Via the engagement member 76, the plate member 78 and the fixation element 82, the end 50 of the linking member 48 thus engages the locking member 66 of the seat back actuator 52. When the linking member 48 is in the position shown by solid-line representation in FIG. 7, the locking member 66 is in the released position, as this term is described hereinabove, such that linear, i.e., axial, movement of the rod 62 relative to the housing 60 of the seat back actuator 52 is blocked. Conversely, when the linking member 48 is moved to the position shown by dashed-line representation in FIG. 7, the locking member 66 is thereby moved via the combination of the engagement member 76, plate member 78 and fixation element 82 to the actuated position, as this term is described hereinabove, such that linear, i.e., axial, movement of the rod 62 relative to the housing 60 of the seat back actuator 52 can occur.

Referring again to FIGS. 4 and 5, another biasing member, e.g., a coiled spring, 54 is positioned between the lever 40 and the plate member 46. In the illustrated embodiment, for example, one end of the biasing member 54 is attached at or near the end 41 of the lever 40, and an opposite end of the biasing member 54 is attached to the plate member 46 at or near the attachment point of the linking member 42 and the plate member 46. The biasing member 54 defines a biasing force that normally draws the end 41 of the lever 40 toward the plate member 46, which positions the armrest $20_1$ in the occupant arm support position relative to the vehicle seat 12, but which is not sufficient to move the plate member 46 to actuate the seat back actuator 52, as illustrated in FIGS. 1 and 4. Accordingly, the seat back actuator 52 is normally in its released position, as defined hereinabove, which blocks the seat back $18_1$ from moving relative to the vehicle seat 12, i.e., from reclining or inclining relative to the vehicle seat 12.

When a downward force, $F_D$, is applied to the armrest $20_1$ ($F_D$ illustrated in FIGS. 1 and 5) when the armrest $20_1$ is in the occupant arm support position, the fixation element extending through the opening $24_2$ in the plate $22_1$ is engaged with the end 32 of the channel and the armrest $20_1$ therefore cannot pivot relative to the seat back $18_1$ without causing the lever 40 to move rearwardly against the biasing force of the biasing member 54. When the downward force, $F_D$, translated through the armrest $20_1$, is sufficient to cause the armrest $20_1$ to move from its occupant arm support position to a second position at which the lever 40 moves sufficiently rearwardly (as shown by the arrow "R" in FIG. 5), the linking member 42 moves the plate member 46 away from the frame 16 (as shown by the arrow "OA" in FIG. 5), and therefore the linking member 48, away from the seat frame 16 thereby drawing the locking member 66 of the seat back actuator 52 away from the flange 70 and into the actuated position. Movement of the armrest $20_1$ downwardly from its occupant arm support position to a second position toward the seat bottom $14_1$ under the downward force, $F_D$, applied thereto thus causes the mechanical linkage 10 to actuate the seat back actuator 52. While the seat back actuator 52 is thus actuated, the seat back $18_1$ may be reclined by applying a rearward force, $F_R$, on the seat back $18_1$ as illustrated in FIG. 1. This rearward force, $F_R$, forces the seat back $18_1$ to recline. It will be appreciated that the armrest $20_1$ and the mechanical linkage 10 may be alternatively configured such that upward movement of the armrest from its occupant arm support position to a second position above the occupant arm support position causes the mechanical linkage 10 to actuate the seat back actuator 52. Any structural modifications required for this alternative configuration would be a mere mechanical step for a skilled artisan.

When the seatback $18_1$ is reclined to a desired position relative to the vehicle seat 12, the downward force on the armrest $20_1$ is removed. When the downward force, $F_D$, on the armrest $20_1$ is removed with the seatback $18_1$ held in the desired reclined position, the locking member 66 returns to its normal position relative to the flange 70, as illustrated in FIG. 7, thereby locking the position of the seat reclining actuator 52. With the position of the seat reclining actuator 52 locked as just described, the reclined position of the seatback $18_1$ is set, and the seat reclining actuator 52 blocks further movement of the seatback $18_1$ relative to the vehicle seat 12. The return of the locking member 66 to its released position draws the plate 46 back to its normal position illustrated in FIG. 4. The biasing force of the biasing member 54 acting between the plate 46 and the lever 40 then returns the lever 40 to its normal position, which returns the armrest $20_1$ to its normal, occupant arm support position.

Because the seat back actuator 52 is configured to automatically retract the rod 62 fully within the housing 60 if no extraction force is applied linearly to the rod 62 when the locking member 66 is moved by the mechanical linkage 10 to its actuated position, the seatback $18_1$ may be returned to its full upright position, as illustrated in FIG. 1, simply by applying the downward force, $F_D$, to the armrest $20_1$ with no rearward force, $F_R$, applied to the seat back $18_1$ or with a rearward force $F_R$ applied to the seat back $18_1$ that is less than the retracting bias applied by the spring 64 to the rod 62 as described hereinabove.

Figure 9:
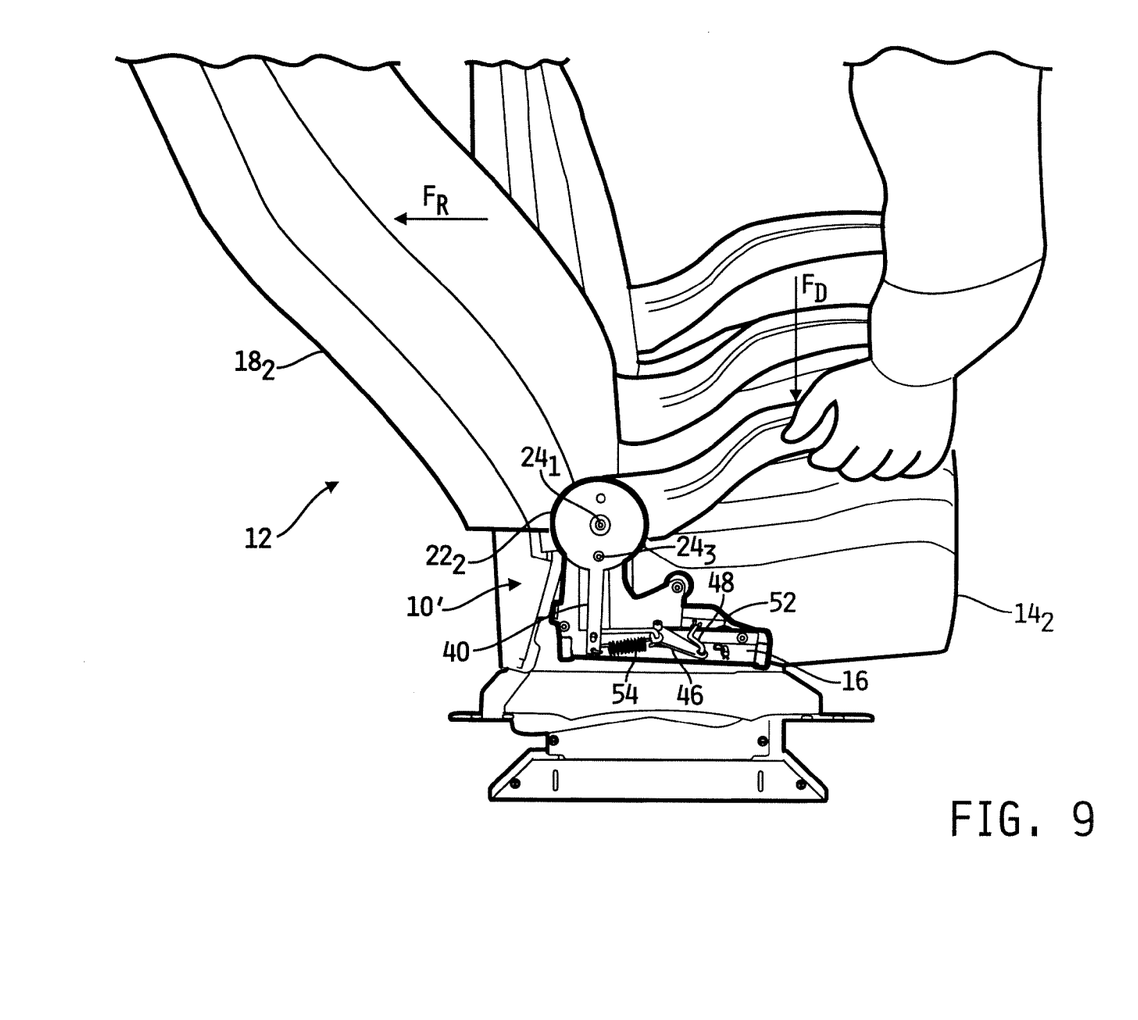
FIG. 9 is a perspective view an alternate embodiment of the motor vehicle seat illustrated in FIG. 1 in which the armrest is not rotatable upwardly as illustrated in FIG. 2, showing manual application of a downward force on the arm rest adjacent to the outer side of the other vehicle seat back to cause the other seat back to be selectively reclinable via manual application a rearward force to the seat back.

Referring now to FIG. 9, a perspective view of the opposite side of the motor vehicle seat 12 illustrated in FIG. 1 is shown. The second of the two occupant seats includes a seat bottom $14_2$ mounted to the seat frame 16, and a seat back $18_2$ that may be reclined as described hereinabove, i.e., by applying a downward force, $F_D$, to the armrest $20_2$ and then applying a rearward force, $F_R$, to the seat back $18_2$. The seat back $18_2$ may likewise be returned from a reclined position to a full upright position as described hereinabove by applying the downward force, $F_D$, to the armrest $20_2$ with no rearward force, $F_R$, applied to the seat back $18_2$ or with a force $F_R$ applied to the seat back $18_2$ that is less than the retracting bias applied by the number of biasing members 68 to the rod 62 as described hereinabove.

The mechanical linkage 10' illustrated in FIG. 9 is identical in many respects to the mechanical linkage 10 illustrated and described hereinabove. The mechanical linkage 10' differs from the mechanical linkage 10 in the attachment of the armrest $20_2$ to the vehicle seat 12. Specifically, the mounting end 26 of the armrest $20_2$ defines the opening 36 therethrough as illustrated in FIG. 3. The mounting end 26 of the armrest $20_2$ may, but need not, define the slot 30 therethrough. In any case, the plate $22_2$ defines an opening $24_3$ therethrough in addition to and generally below the opening $24_1$. Fixation elements are received through the openings $24_1$ and $24_2$, which align with openings 28 and 36 of the mounting end 26 of the armrest $20_2$ illustrated in FIG. 3. Thus, in the embodiment illustrated in FIG. 9, the armrest $20_2$ is movable, e.g., pivotable, downwardly in response to a force, $F_D$, applied thereto to cause the remainder of the mechanical linkage 10' to actuate the seat back actuator 52 as described hereinabove. Unlike the armrest $20_1$, however, the armrest $20_2$ is not movable or pivotable upwardly to facilitate occupant entrance into and egress from the vehicle seat 10

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An apparatus for selectively moving a seat back of a motor vehicle seat relative to a seat bottom of the motor vehicle seat, the apparatus comprising:
    an armrest movably mounted to the motor vehicle seat, the armrest having a first position relative to the motor vehicle seat that supports an arm of an occupant of the motor vehicle seat, the armrest movable relative to the vehicle seat, in response to a force applied thereto, from the first position to a second position,
    a seat back actuator responsive to actuation thereof to allow the seat back of the motor vehicle seat to be moved between an upright position and a fully reclined position relative to the seat bottom, and responsive to release thereof to block movement of the seat back relative to the seat bottom, and
    mechanical linkage engaged with and between the armrest and the seat back actuator, the mechanical linkage responsive to movement of the armrest from the first position to the second position to actuate the seat back actuator and to otherwise release the seat back actuator.

2. The apparatus of claim 1 wherein the motor vehicle seat comprises a seat frame with the seat bottom mounted thereto,
    and wherein the seat back is movably mounted via the seat back actuator to the seat frame adjacent one end thereof with an opposite end of the seat back extending away from the seat frame and the seat bottom,
    and wherein the seat back is movable relative to the seat frame and the seat bottom between the upright position and the fully reclined position when the seat back actuator is actuated,
    and wherein the seat back can be non-movably positioned in a desired position between the upright position and the fully reclined position by moving the armrest to the second position to release the seat back actuator after the seat back is moved to the desired position with the seat back actuator actuated.

3. The apparatus of claim 2 wherein the seat back actuator comprises a biasing member that biases the seat back to the upright position when the seat back actuator is actuated.

4. The apparatus of claim 3 wherein the seat back is movable to the desired position from the upright position if a rearward force sufficient to overcome a biasing force of the biasing member is applied to the seat back when the seat back actuator is actuated.

5. The apparatus of claim 4 wherein the seat back is pivotably mounted to the seat frame via the seat back actuator such that the seat back is pivotable between the upright position and the fully reclined position when the seat back actuator is actuated.

6. The apparatus of claim 1 wherein the armrest is positioned above the seat bottom, and wherein the armrest is movable downwardly toward the seat bottom from the first position to the second position thereof.

7. The apparatus of claim 1 wherein the armrest is positioned above the seat bottom, and wherein the armrest is movable upwardly away from the seat bottom from the first position to the second position thereof.

8. An apparatus for selectively moving a seat back of a motor vehicle seat relative to a seat bottom of the motor vehicle seat, the apparatus comprising:
    an armrest having a mounting end pivotably mounted to one side of the seat back and a free end opposite the mounting end, the armrest having a first position relative to the motor vehicle seat that supports an arm of an occupant of the motor vehicle seat, the armrest movable relative to the vehicle seat in response to a force applied thereto from the first position to a second position,
    a seat back actuator responsive to actuation thereof to allow the seat back of the motor vehicle seat to be moved relative to the seat bottom, and responsive to release thereof to block movement of the seat back relative to the seat bottom, and
    mechanical linkage engaged with and between the armrest and the seat back actuator, the mechanical linkage responsive to movement of the armrest from the first position to the second position to actuate the seat back actuator and to otherwise release the seat back actuator, wherein the mechanical linkage comprises a biasing member that normally biases the armrest to the first position, and wherein the seat back actuator is actuated by applying a downward force to the armrest sufficient to overcome a biasing force of the biasing member of the mechanical linkage and move the mechanical linkage sufficiently to actuate the seat back actuator.

9. The apparatus of claim 8 wherein the armrest is movable only downwardly from the first position to the second position thereof.

10. The apparatus of claim 8 wherein the armrest is movable downwardly from the first position to the second position thereof, and wherein the armrest is movable upwardly from the first position thereof toward the seat back, without actuating the seat back actuator, to facilitate occupant entrance into and egress from the motor vehicle seat.

11. The apparatus of claim 10 wherein the mounting end of the armrest defines a slot therethrough, and wherein the armrest is rotatable upwardly about the slot between the first position thereof and a third position adjacent to a side of the seat back.

12. The apparatus of claim 1 wherein the seat back actuator comprises:

a first member mounted to one of the seat back and a frame of the motor vehicle seat, a second member mounted to the other of the frame and the seat back and movable relative to the first member, and a locking member positioned to normally block movement between the first and second members to thereby normally block movement of the seat back relative to the motor vehicle seat, the locking member further movable to an actuated position that allows movement between the first and second members, wherein the mechanical linkage is coupled to the locking member and is responsive to movement of the armrest from the first to the second position thereof to move the locking member to the actuated position.

13. The apparatus of claim 1 wherein the armrest defines a mounting end and a free end, the mounting end pivotably mounted to one side of the seat back, and wherein the mechanical linkage comprises:

a first member mounted to the mounting end of the armrest, a second member movably mounted to a frame of the motor vehicle seat, a first linking member attached between the first and second members, a second linking member attached between the second member and the seat back actuator, and a biasing member extending between the first and second members, the biasing member normally biasing the first member toward the second member, wherein application of a force applied to the armrest sufficient to overcome a biasing force of the biasing member such that the armrest moves from the first position to the second position thereof causes the first member to move the second member away from the seat back actuator such that the second linking member actuates the seat back actuator.

14. The apparatus of claim 1 wherein movement of the seat back relative to the seat bottom requires a rearward force applied to the seat back while the seat back actuator is actuated.

15. A method of reclining a seat back of a motor vehicle seat relative to a seat bottom of the motor vehicle seat, the motor vehicle seat having an armrest movably coupled to the motor vehicle seat and to a seat back actuator responsive to actuation thereof to allow the seat back of the motor vehicle seat to be moved relative the seat bottom, the armrest biased by a first biasing member to a first position relative to the motor vehicle seat and movable against the bias of the first biasing member from the first position to second position relative to the motor vehicle seat, the method comprising:

applying a first force to the armrest sufficient to overcome the bias of the first biasing member to move the armrest from the first position the second position thereof to actuate the seat back reclining actuator, maintaining the armrest in the second position to maintain the seat back reclining actuator actuated, and with the armrest maintained in the second position, applying a second force to the seat back to recline the seat back to a reclined position relative to the seat bottom.

16. The method of claim 15 wherein the seat back actuator is responsive to release thereof to block movement of the seat back relative to the seat bottom, and wherein the method further comprises:

maintaining the seat back in the reclined position, and with the seat back maintained in the reclined position, removing the first force applied to the armrest to return the armrest to the first position to release the seat back actuator and thereby maintain the seat back in the reclined position.

17. The method of claim 16 wherein the seat back actuator includes a second biasing member configured to bias the seat back toward the upright position and wherein the method further comprises moving the seat back from the reclined position to the upright position by applying the first force to the armrest with no second force applied to the seat back that is sufficient to overcome the bias of the second biasing member.

18. The method of claim 15 wherein the seat back is continuously movable between an upright position and a fully reclined position when the seat back actuator is actuated, and wherein the reclined position is any position of the seat back between the upright position and the fully reclined position, including the fully reclined position.

19. The method of claim 18 wherein the seat back actuator is responsive to release thereof to block movement of the seat back relative to the seat bottom, and wherein the method further comprises:

maintaining the seat back in the reclined position, and with the seat back maintained in the reclined position, removing the first force applied to the armrest to return the armrest to the first position to release the seat back actuator and thereby maintain the seat back in the reclined position.

20. The method of claim 19 wherein the seat back actuator includes a second biasing member configured to bias the seat back toward the upright position, and wherein the method further comprises moving the seat back from the reclined position to the upright position by applying the first force to the armrest with no second force applied to the seat back that is sufficient to overcome the bias of the second biasing member.

* * * * *